Patented Feb. 11, 1941

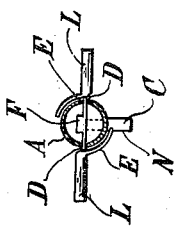

2,231,121

UNITED STATES PATENT OFFICE 2,231,121

BAND-TYPE MICROMETER

Leopoldo Hörmann, Buenos Aires, Argentina

Application December 29, 1939, Serial No. 311,656
In Argentina September 27, 1939

3 Claims. (Cl. 33—179)

The present invention relates to measuring instruments and particularly to those of the micrometer type; more especially the present invention relates to an instrument for rapidly measuring with a considerable degree of accuracy the contour of rounded and irregular shaped bodies, such for example as teeth.

In many instances, it is necessary to obtain a fairly accurate measurement of the contour of a round, elliptical or slightly irregularly shaped body situated in such a position that it is not readily accessible by any of the usual measuring means.

The principal object of the present invention is to provide a cheap, durable and accurate instrument of size small enough to be introduced into cavities such, for example, as the human mouth.

A further object of the present invention is to provide a band-type micrometer in which the measuring element is a flexible band, one end of which is anchored to the body of the instrument, whereas the other is attachable to a slidable member which co-operates with a scale of graduation to indicate the size of the body.

In the drawing:

Fig. 1 is a side view of my novel band-type micrometer seen so as to show the embrace of the measuring portion of the band.

Fig. 2 is an end view of the instrument shown in Fig. 1, as seen from the right-hand of Fig. 1.

Fig. 3 is a side view of the same instrument as shown in Fig. 1, rotated through 90° and, Fig. 4 is an end view of the instrument shown in Fig. 2, similar to that of Fig. 3.

As shown in the accompanying drawing, my novel micrometer consists of an elongated housing A which is preferably of circular cross section and has, as shown, a pair of longitudinal slots D diametrically opposite each other. If desired, only one slot or more than two may be provided.

Through these slots extend projections E forming part of a slidable member F located within the housing. Preferably, two projections pass through each of the slots D so as to form diametrically opposite pairs and these pairs are joined together by means of bars J running lengthwise of the housing and in relatively close contact therewith. If desired, finger bars L may be provided projecting from the projections E so as to facilitate the manipulation from the outside of the slidable member F.

One end of the housing A preferably has its diameter gradually reduced to form a narrow extremity which is open to allow a flexible band C to pass into the housing. The end of the flexible band C lying within the housing is permanently secured to the slidable member F and the other end of said flexible band is permanently secured to a small heel-like projection G formed at or secured to the narrow extremity of the housing. In this way, the flexible band C forms at the narrow end of the housing A a loop N which is adjustable by moving the slidable member in either direction lengthwise of the housing as by means of the finger-bars L. Alongside one or both of the slots D a suitable scale indicated at K is provided and one or both of the cross-bars J may have engraved or otherwise inscribed on it a vernier scale H. The grip or friction of the projections E and their cross-bars J is sufficient to hold the slidable member in its adjusted position corresponding to close encirclement of the object to be measured by the looped end of the flexible band. The length of the contour required is read off on the scales K and H. The end of the housing remote from the loop end may be closed by means of a screwed cap W.

As will be readily understood by those skilled in the art, my novel band-type micrometer is applied in practice by moving the slidable member towards the narrow extremity of the housing a sufficient distance to provide a loop which can be comfortably placed over the object to be measured and, thereafter, retracting the slidable member until the loop end grips the object to be measured with the tightness depending on the accuracy of measurement desired or on the conditions under which the measurement has to be conducted. While still maintaining the slidable member in its measuring position, the loop end is removed from the object and the length of the contour thereof is read off on the scale. For working in cavities such as the human mouth it is preferable, however, to make the housing sufficiently long so that when the loop is applied to the inmost objects to be measured, for example, the wisdom teeth, the contour length can be read on the scale from outside the mouth. This enables a considerable degree of accuracy to be obtained without causing any major inconvenience to the person.

I claim:

1. A band-type micrometer device for measuring the contour length of rounded and irregularly shaped objects comprising an elongated housing, having one end gradually reduced to form a narrow open extremity and provided with a pair of oppositely disposed slots running lengthwise of said housing, a slidable member located within said housing and having at each side a pair of projections extending through one of said slots, said pair of projections being joined together outside said housing by a bar parallel with the corresponding slot, a heel-like lateral projection at the narrow open extremity, a flexible band having one end secured to said heel-like projection and extending laterally from said casing, said band forming a loop and passing tangentially therefrom into said housing through the opening of said narrow extremity and having its other end secured to said slidable member, and a scale of length units alongside at least one of said slots.

2. A band-type micrometer device for measuring the contour length of rounded and irregularly shaped objects comprising an elongated housing having an opening at one extremity and a slot running lengthwise of said housing, a slidable member located within said housing and having a pair of projections extending through said slot and joined together outside of said housing by a bar parallel to said slot, a heel-like lateral projection at the extremity of the housing having said opening, a flexible band having one end secured to said heel-like projection, said band forming a loop and passing tangentially therefrom through said opening into said housing and having its other end secured therewithin to said slidable member, and a scale of length units alongside said slot.

3. A band-type micrometer device for measuring the contour length of rounded and irregularly shaped objects comprising an elongated longitudinally slotted housing having one end gradually reduced to form a narrow open extremity, a heel-like lateral projection at said extremity, a flexible band having one end connected to said heel-like projection and extending outward therefrom transversely of said casing to form a loop, the opposite end of said loop extending axially within said casing, a member slidable upon said casing having an external finger engaging portion, and a portion extending through said slot within said casing and connected to said band, said external portion being movable on said casing to contract said loop about the object to be measured and together with said casing being provided with cooperating means for indicating the size of the loop.

LEOPOLDO HÖRMANN.